R. G. HUIDOBRO.
BREAD MAKING MACHINE.
APPLICATION FILED OCT. 27, 1919.

1,380,652.

Patented June 7, 1921.
3 SHEETS—SHEET 1.

Inventor
Rogelio Gallo Huidobro
By
Attorney

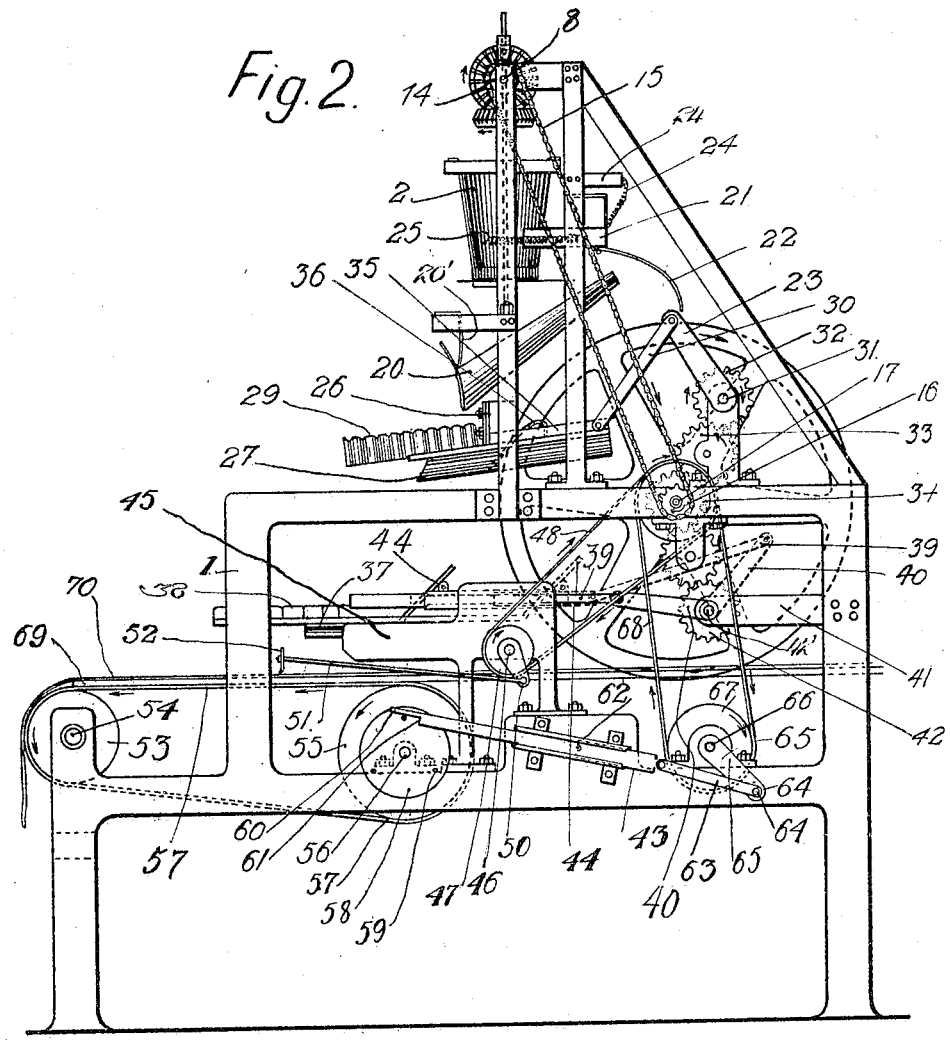

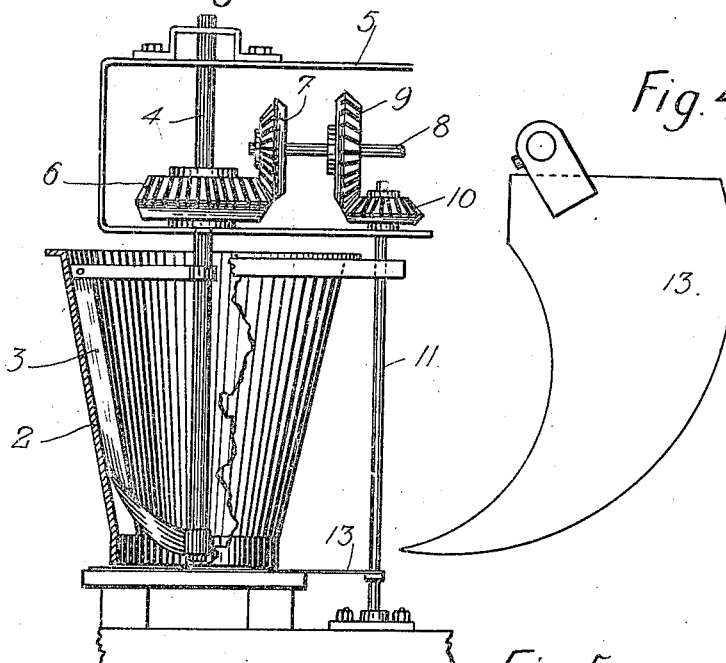
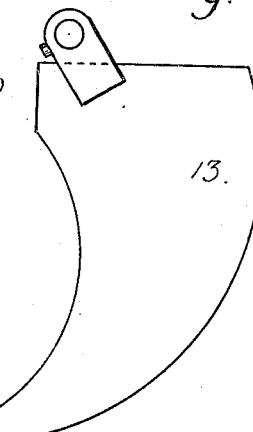
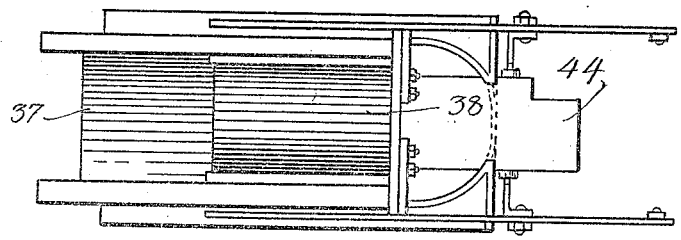
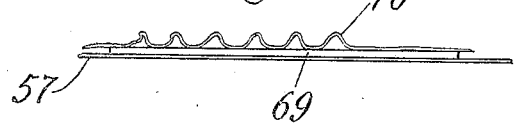

UNITED STATES PATENT OFFICE.

ROGELIO GALLO HUIDOBRO, OF MEXICO, MEXICO.

BREAD-MAKING MACHINE.

1,380,652.   Specification of Letters Patent.   Patented June 7, 1921.

Application filed October 27, 1919. Serial No. 333,692.

*To all whom it may concern:*

Be it known that I, ROGELIO GALLO HUIDOBRO, subject of H. M. the King of Spain, residing at Mexico city, Federal District, Mexico, have invented certain new and useful Improvements in Bread-Making Machines, of which the following is a specification.

This invention covers a bread-making machine especially adapted for shaping rolls ready to be baked in an oven, the principal object being to provide, in one single machine, a revolving appliance which will prepare the dough to be cut, a cutter arranged to separate, from the mass of dough, pieces of equal size, kneading appliances into which the pieces drop and which will turn them out shaped like balls, a pushing appliance which will discharge the balls of dough into a shaping appliance, which will shape them into the lengthened and pointed form required to make rolls, and a second pushing appliance which will unload the pieces of shaped dough upon a conveyer belt furnished with an appliance for plaiting a cloth which separates the pieces thus shaped in order to prevent them from sticking to one another, and leaving them ready so they may rise and afterward be placed in the oven.

All the foregoing operations I accomplish by means of the machine illustrated by the attached drawings of which:

Figure 1 is an elevation of one end of the machine;

Fig. 2 a side elevation of the same;

Fig. 3 an elevation of the receptacle for the dough, showing the kneader, and with part of the wall of the kneading receptacle broken away.

Fig. 4 is a detail view of the cutting knife;

Fig. 5 is a plan view of the shaper;

Fig. 6 is an edge view of the board and the plaited cloth for separating the shaped lumps of dough.

Figure 1:
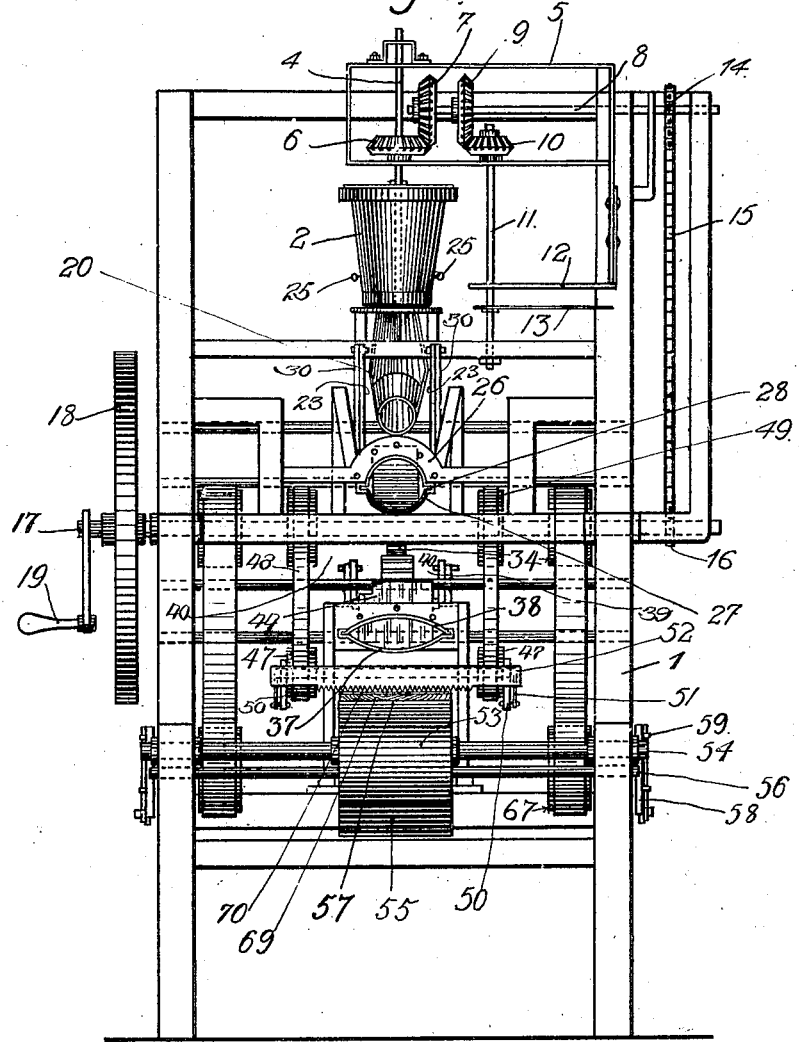

With regard to the drawings, (1) is the framework of the machine in the upper part of which is held a conical kneading receptacle (2) open at the bottom, and within which is arranged a helicoidal conical agitator (3) fastened to a shaft (4) mounted in a support (5) and provided with a bevel gear (6) which engages a bevel gear (7) fastened to shaft (8). The latter also carries a bevel gear (9) which engages a bevel gear (10) on a small shaft (11) mounted in a support (12), the lower end of the shaft (11) having fastened to it the dough-cutting knife (13). Shaft (8) carries a sprocket wheel (14) which is connected by means of a chain (15) with a pinion (16) fastened on the main shaft (17), which at its other end carries a fly-wheel (18) and crank (19) in order to impart movement to the shaft by hand, or when so desired; to connect the fly wheel to a motor so as to operate as a pulley.

Underneath the receptacle (2), is located a chute (20), which is suspended at its front end from an extension on one of the horizontal cross-beams of the framework by means of a plate 20′, the upper end of which is hooked over the extension, the chute being so positioned as to catch the severed pieces of dough falling from the receptacle. Above the upper or rear part of the receptacle (2), there is arranged a sifter (21), from which flour may be dropped upon the chute (20), there being mounted on the sifter two small curved levers (22) the ends of which will be struck by the crank arms (23), so that, therefore, the sifter (21) is shaken, and returned to its normal position maintained by the springs (24) and (25). The spring 24 is disposed vertically and is attached at its upper end to a block 24′ to which the receptacle 2 is fastened in some suitable manner, said block being connected to the framework of the machine. Spring 24 tends to pull the sifter in an upward and rearward direction, but is counterbalanced by the springs 25, two of which are utilized and which tend to pull the sifter forwardly; said springs 25 being arranged on opposite sides of the receptacle and fastened thereto at their front ends and to the opposite sides of the sifter at their rear ends.

Underneath the chute (20) is located an arched bridge (26) which is suitably connected with the framework and beneath which there is located a kneading trough (27) provided along each edge with a flange which engages a guide groove (28) formed along the adjacent edge of an arched and corrugated kneader (29), thus permitting sliding movement therebetween. The kneader is moved by the connecting bars (30) pivoted to the cranks (23) which are fixed to the shaft (31) on which are fastened the pinions (32) which engage in pinions (33) which receive the movement from the pinions (34) fastened upon the main shaft (17).

To the back part (35) of the kneader (29)

is fastened a slanting, scraping and pushing member (36) which slides on the stationary kneading trough (27) and which pushes the lump or ball of dough in front of it in order that the ball may fall upon the trough-shaped or concave shaper (37) which is fixed in position and provided with guides in which the edges of the arched upper shaper (38) are engaged. The latter is connected by means of the connecting bars (39) to the crank (40) which are pivoted on the bracket (41), and on the shaft 42′ whereon said cranks are mounted are fastened the pinions (42) which mesh with pinions (43) which on their part mesh with pinions (34) on the main shaft (17).

To the upper curved and sliding shaper (38) is pivotally fastened a scraper and pusher (44), and on the intermediate frame (45) is mounted a shaft (46) provided with a pair of pulleys (47) connected by belts (48) with the pulleys (49) mounted on the main shaft (17), said shaft (46) also carrying a pair of cranks (50) to the ends of which are fastened the rods (51) joined at their ends by the comb (52) which plaits the cloth 70 on which the shaped pieces fall.

On the lower part of the frame (1) are mounted a roller (53) fastened to a shaft (54), and another (55) mounted on a shaft (56), over which rollers the endless belt (57) passes. The shaft (56) carries at its ends disks (58) provided on their surfaces with three projecting bolts (59) which are successively engaged by the notched front ends (61) of levers (60). These levers slide on tracks (62) and are pivoted at their rear ends to connecting rods (63) which, in turn, are pivoted at (64) to a pair of cranks (65) fixed to a shaft (66). The latter carries a pair of pulleys (67) which are connected by belts (68) to the main shaft (17).

A board (69) is disposed upon the belt (57) and projects from the back part of the machine, which is on the right of Fig. 2, and on this board are located the strips of cloth (70) on which the shaped rolls are placed.

The operation of the machine is as follows:

The dough is placed in the hopper (2), and when the machine starts the agitator (3) kneads the dough which, by its own weight, will fall through the bottom of the hopper (2), and a lump of dough whose size is determined by the surface of the knife (13) and, of course, also by the time during which the surface of the knife obstructs the bottom of the hopper, is cut off. The lump of dough will immediately fall into the chute 20, which receives flour from the sifter (21), in order to prevent the lump from sticking to anything with which it may come in contact. From the chute (20) the lump of dough will fall into the trough (27), at the moment when the upper grooved and corrugated kneader (29) has reached the limit of its forward or leftward movement, the lump striking the top of the inclined pusher (36). The kneader than starts its rightward movement, due to the different connections, and when said kneader (29) is again moved leftward or forward the lump of dough—now kneaded into the shape of a ball—is carried over the end of trough (27) and falls on the upper portion of the pivotally-mounted pusher (44) which is mounted on the front end of the upper shaper (38). The latter has just reached the end of its advance movement toward the left, and then immediately moves backward or toward the right, during which time the ball of dough receives its shape, being flattened more or less into the form of a roll—that is, with pointed ends. When the upper shaper (38) moves again toward the left, it completes the shaping of the lump which is pushed forward by the pusher (44), and is discharged at the front end of the fixed lower shaper (37), falling upon the cloth (70) spread out on the board (69) which rests on the endless belt (57). As all the transmissions have continued in operation, the said belt (57) will be moved forward by the levers (60) which, at each forward stroke (which corresponds to one revolution of the pulleys (67)), will move the roller 55 forward one-third of a revolution, due to the arrangement of the projecting bolts (59). The plaiting comb (52) has its teeth turned somewhat forward, that is, toward the left of Fig. 2, so that upon being withdrawn toward the right, due to the movement of its connection with the cranks (50), it will not draw the cloth (70), but on the other hand, when the rods (51) advance the comb (52), the latter will plait the cloth (70) in such a way that for each roll which falls on the cloth (70) there will be a plait behind the roll separating it from the following roll which is turned out by the machine. Hence, the whole board may be loaded, with the rolls well separated, as will be understood from Fig. 6.

Having thus described my invention what I claim is:

1. A bread-making machine comprising in combination a dough-receiving hopper provided with an agitator; a knife underneath said hopper; a chute underneath the knife to convey the separated piece of dough, a lower fixed kneader and an upper kneader slidable thereon, and between which each piece of dough is kneaded; a fixed curved shaper; an upper curved shaper slidable on the fixed shaper; an endless belt operated in timed sequence with the slidable shaper; and a reciprocating plaiting comb moved simultaneously with the corresponding movement of the shaper.

2. A bread-making machine, comprising in combination a dough-receiving hopper provided with a discharge opening in its bottom and with an agitator; a knife oscillating beneath the bottom of the hopper to sever pieces of dough discharged through said opening; a chute under the knife; a shaking flour sifter; a lower fixed kneader, and an upper corrugated kneader reciprocating on the fixed kneader; a slanting pushing and scraping member slidable at a distance from the reciprocating kneader; a fixed lower curved shaper; an upper curved shaper slidable on the lower shaper; a scraper and pushing member movable upon the lower shaper together with the upper sliding shaper, but located at a distance from same; an intermittently-movable endless belt; a board resting on said belt; and an intermittently-movable plaiter for plaiting a cloth extended on top of said board.

3. In bread-making machinery, the combination of kneading mechanism; means for supplying lumps of dough thereto; mechanism for shaping the kneaded lumps, comprising a fixed lower shaper and an upper shaper slidable thereon; conveying mechanism operating in timed sequence with the upper shaper and including a cloth-supporting element adapted to be loaded with the shaped lumps; and a reciprocating comb for forming pockets in the cloth to receive the individual shaped lumps and space them from one another.

4. In bread-making machinery, the combination of a lower fixed kneader; an upper kneader slidable thereon; means for delivering lumps of dough to the space between said kneaders to be kneaded by the kneaders; shaping mechanism to which the kneaded lumps of dough are delivered, comprising a fixed, curved lower shaper and a slidable upper shaper; and conveying mechanism to which the shaped lumps are delivered from the shaping mechanism.

5. In bread-making machinery, the combination of a lower fixed kneader; an upper kneader slidable thereon; means for delivering lumps of dough to the space between said kneaders to be kneaded by the kneaders; shaping mechanism located beneath the kneaders and comprising a fixed, curved lower shaper and a slidable upper shaper; a pusher carried by the slidable kneader to force a kneaded lump of dough over the edge of the fixed kneader and thereby deliver it to the shaping mechanism; conveying mechanism located beneath the shaping mechanism for removing the shaped lumps from the machine; and a pusher carried by the slidable shaper to force a shaped lump of dough over the edge of the fixed shaper and thereby deliver it to the conveying mechanism.

In testimony whereof I have affixed my signature.

ROGELIO GALLO HUIDOBRO.